(No Model.)
I. EATON.
BRAKE LEVER.
No. 436,221. Patented Sept. 9, 1890.
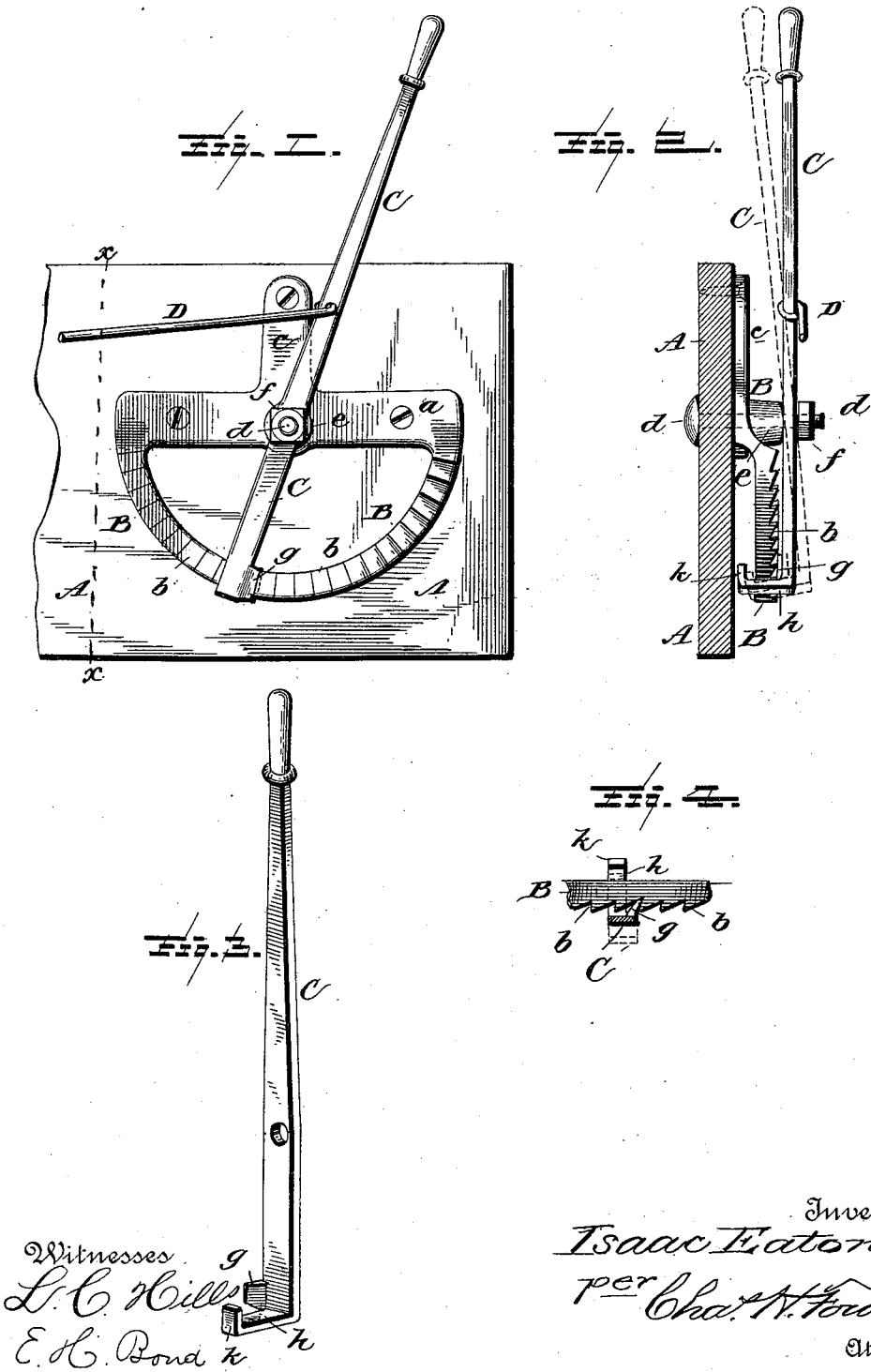
Witnesses
L. C. Hills
E. H. Bond
Inventor
Isaac Eaton,
per Chas. N. Fowler,
Attorney

UNITED STATES PATENT OFFICE.

ISAAC EATON, OF NEW SHARON, IOWA.

BRAKE-LEVER.

SPECIFICATION forming part of Letters Patent No. 436,221, dated September 9, 1890.

Application filed June 12, 1890. Serial No. 355,121. (No model.)

*To all whom it may concern:*

Be it known that I, ISAAC EATON, a citizen of the United States, residing at New Sharon, in the county of Mahaska and State of Iowa, have invented certain new and useful Improvements in Locks for Wagon and other Vehicle Brakes; and I do hereby declare that the following is a full, clear, and exact description of the same, reference being had to the annexed drawings, making a part of this specification, and to the letters of reference marked thereon.

This invention relates to certain new and useful improvements in brake-locks for vehicles; and it has for its object to provide a simple, cheap, and durable device of this character, easily operated and reliable in its action.

The novelty resides in the peculiar combinations and the construction, arrangement, and adaptation of parts, all as more fully hereinafter described, shown in the drawings, and then particularly pointed out in the appended claims.

The invention is clearly illustrated in the accompanying drawings, which, with the letters of reference marked thereon, form a part of this specification, and in which—

Figure 1 is a top plan of my improvement. Fig. 2 is a section on the line $x$ $x$ of Fig. 1. Fig. 3 is a perspective view of the operating-lever detached. Fig. 4 is a detail, partly in side elevation and partly in section, showing the engagement of the pawl with the teeth of the segmental plate.

Like letters of reference indicate like parts throughout the several views.

Referring now to the details of the drawings by letter, A designates a portion of a wagon-body to which is attached the plate B, which is formed with a segmental toothed portion $b$, a connecting cross-bar $a$, provided with holes through which pass the screws or other securing means, and an arm or lug $c$, extending centrally from the cross-bar at right angles thereto, and provided with a hole for the reception of securing means, as shown. The toothed segmental portion is raised above the connecting-bar, so that when it is secured to the wagon there will be a space between the said toothed portion and the body, as shown in Fig. 2, to allow for the working of the pawl end of the operating-lever, as seen in said Fig. 2.

Extending from the plate B, at a point at the junction of the cross-bar and arm, is a stud $d$, provided with a washer or boss $e$, and on this stud is pivoted the operating-lever C, being secured from displacement by a nut $f$ screwed upon the screwed end of the stud, as shown best in Fig. 2. This lever is provided at the end farthest from the handle with a pawl $g$, which extends at an angle thereto, as shown in Fig. 4, and at this end the lever is also formed with a right-angled portion $h$, terminating in a lug $k$, at right angles thereto, as shown, the space between the two parallel portions being greater than the thickness of the toothed segmental portion of the plate B.

D is a spring-connection attached at one end to the operating-lever and designed to be connected at its other end with the brake or brake shoe.

The operation is simple and apparent. The lever is pulled upon, and when the brake has been applied with sufficient force the pawl is engaged with the teeth of the segmental plate. When it is desired to release the same, the lever is depressed at its handle end, as shown by dotted lines in Fig. 2, when the pawl is raised from its engagement with the teeth and the spring draws the lever back to its normal position. The space between the segmental portion and the wagon allows of this movement of the lever.

What I claim as new is—

1. The combination, with the plate having a raised toothed segmental portion, of the operating-lever pivoted on the plate and provided with a pawl and a hook embracing the toothed portion of the plate, with a lug $k$ parallel with the main portion of the lever and at right angles to the said pawl, the said lever having an oscillating movement on its pivot, substantially as specified.

2. The combination, with the plate having a raised toothed segmental portion, of the operating-lever pivoted on the plate and formed at one end with a pawl extending at an angle from the lever, a portion at right angles to the lever, and a portion at right angles to the latter, the space between the two parallel portions being greater than the thickness of the segmental portion, substantially as and for the purpose specified.

In testimony that I claim the above I have hereunto subscribed my name in the presence of two witnesses.

ISAAC EATON.

Witnesses:
ROBERT A. FARMER,
JAMES C. FISHER.